United States Patent [19]

Hempel et al.

[11] 4,406,094
[45] Sep. 27, 1983

[54] APPARATUS FOR ANCHORING SELF-SUPPORTING, TALL STRUCTURES

[75] Inventors: Joachim Hempel; Leonhard Christoph, both of Hamburg; Wolfram Schöne, Buxtehude, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 233,061

[22] Filed: Feb. 10, 1981

[30] Foreign Application Priority Data

Feb. 28, 1980 [DE] Fed. Rep. of Germany ....... 3007442

[51] Int. Cl.³ ............................................. E04H 12/00
[52] U.S. Cl. ......................................... 52/40; 52/148; 52/296; 416/11
[58] Field of Search ....................... 52/1, 40, 148, 296, 52/297, 298, 573, 295, 403, 167; 416/9, 11, 134 A, 142 B; 248/632, 634; 277/12

[56] References Cited

U.S. PATENT DOCUMENTS

| | | | |
|---|---|---|---|
| 1,234,893 | 7/1917 | Fridley | 52/297 |
| 2,064,121 | 12/1936 | Jenner | 52/148 |
| 3,193,059 | 7/1965 | Wallerstein, Jr. | 52/297 |
| 3,764,230 | 10/1973 | Rybicki et al. | 416/134 A |
| 4,045,968 | 9/1977 | Gerwick, Jr. | 52/167 |
| 4,106,301 | 8/1978 | Gerwick, Jr. | 52/167 |
| 4,121,393 | 10/1978 | Renault et al. | 52/167 |

FOREIGN PATENT DOCUMENTS

| | | | |
|---|---|---|---|
| 131658 | 11/1902 | Fed. Rep. of Germany | 52/298 |
| 2450064 | 10/1973 | Fed. Rep. of Germany | 52/297 |

*Primary Examiner*—Alfred C. Perham
*Assistant Examiner*—Mark J. Sofia
*Attorney, Agent, or Firm*—W. G. Fasse; D. H. Kane, Jr.

[57] ABSTRACT

This apparatus relates to anchoring self-supporting tall structures such as masts, towers or the like in a foundation. The structure (2) is supported in the foundation (5) at its lower end on a pivot bearing (10). The weight of the tower is borne on this bearing. The structure is furthermore elastically clamped to the wall of the foundation at a location above the pivot bearing by elastic clamping device (11) operatively interposed between the wall of the foundation (5) and the sides of the tower. The clamping device generally comprises spring damper elements for damping and suppressing vibrations. The spacing between the pivot bearing and the elastic clamping device, and the characteristics of the elastic damping material are selected to lower and suppress resonance frequencies in the structure.

6 Claims, 3 Drawing Figures

APPARATUS FOR ANCHORING SELF-SUPPORTING, TALL STRUCTURES

CROSS-REFERENCE TO RELATED APPLICATION

The present application relates to German Patent Application No. P30 07 442.1-25; filed in the Federal Republic of Germany on Feb. 28, 1980. The priority of said German filing date is hereby claimed.

BACKGROUND OF THE INVENTION

The invention relates to an apparatus for anchoring self-supporting tall structures such as masts, towers or the like in a foundation.

Such tall structures have been anchored to foundations in different ways. For example, it is possible to secure or clamp these tall structures rigidly in the foundation. However, it has been found in connection with tall masts used for wind-driven power generators, that damage to the foundation occurs after a short operational period due to the dynamic loads. Such dynamic loads in this instance, for example, are due to the wind forces or due to vibrations transmitted from the propeller to the wind-driven power generator.

Further, it is also possible to secure such structures by stay wire means. However, this again results in problems with the wires, the wire heads, the pivotal wire connections and the foundations for the wire anchoring. Besides, stay wire means require a substantial space so that in connection with the wind-driven power generator, for example, problems may occur with the free operation of the propeller since it is absolutely necessary to avoid any interference between the free rotation of the propeller and the stay wires. Further, the high tension of the wires or cables must be taken up by the foundation of the tall structure. Extremely high additional normal forces or loads therefore may occur due to the vertical components of the tension forces in the wires or cables.

German Patent Publication (DE-OS) No. 2,450,064 discloses the self-supporting elastic clamping of parking meters, road or street signs, street lighting masts, flag-posts or fence posts in a foundation. As compared to a rigid clamping, such an elastic clamping has the advantage that the structure cannot easily break off. According to said prior art as disclosed in German Patent Publication No. 2,450,064, the post or mast is inserted into a tubular bore of the foundation whereby a bushing of elastic material is arranged and the upper edge of the bore and the bushing is anchored in the foundation.

A sleeve which grips the post or mast is pressed in position between the bushing on the one hand and the post or mast on the other hand. Thus, the bushing is compressed by about 30% of its volume. However, the combination comprising the bushing and sleeve remains elastic within certain limits. The reference does not disclose anything further regarding supports for tall posts or masts.

The self-supporting, tall structures to which the invention particularly pertains are, for example, masts for wind-driven power generators. Such masts may presently reach heights of more than 100 meters in certain instances and carry a rotor at the tip of the mast. The rotor is wind driven as well as operatively connected to a generator. The forces effective on such structures are caused on the one hand by the wind which is effective on the mast and the rotor, thereby causing buckling loads and bending loads on the mast. Further, dynamic forces occur additionally and these dynamic forces may also be due to the wind but also due to the transmission of the vibrations of the rotor onto the mast. These forces in turn may cause vibrations of the mast which may correspond to the resonance frequencies of the mast or they may correspond to an interference between these frequencies and the frequencies of other system vibrations. If one takes into account that the tip of the mast of such wind-driven power generators may perform pendal motions of several meters in response to the corresponding forces effective on the mast, it will be appreciated, that a substantial importance attaches to the support of the mast.

OBJECTS OF THE INVENTION

In view of the above, it is the aim of the invention to achieve the following objects singly or in combination;

to provide a structurally simple support for a tall self-supporting structure substantially without stay wires or cables whereby the support structure is able to take up the forces effective on the tall structure in the longitudinal direction as well as in the lateral direction;

to provide a foundation system for tall structures including spaced apart bearing elements incorporating elastic damping material so that the spacing and elasticity can be adjusted to lower and damper resonant vibrations of the structure; and to provide a system for non-rigid resilient foundation anchoring of a tall structure whereby the anchoring permits radial movement of the tall structure while simultaneously damping vibrations of the structure, thereby reducing stress loads on the structure and foundation.

SUMMARY OF THE INVENTION

According to the invention there is provided an apparatus for anchoring self-supporting tall structures in which the lower end of the tall structure is pivotally supported at the foundation. Furthermore, an elastic clamping is provided between the foundation and the tall structure above the pivotal support. This combination according to the invention of a supporting pivotal bearing with an elastical clamping has several advantages.

Contrary to a stay wire securing of the tall structure, the lower pivot bearing according to the invention is required to take up as a vertical component only the weight of the tall structure. Additionally, the pivotal bearing makes possible in connection with the elastic clamping a pivoting of the entire tall structure about the pivot bearing also referred to as a foot bearing. If the lower end of the tall structure would be rigidly clamped, any bending effect between the elastic clamping and the rigid clamping would result in heavy loads which frequently result in damage to the structure and/or the foundation.

The elastic clamping of the structure in the foundation above the pivot bearing may be so selected that adverse vibrations of the structure are avoided or damped down to permissible values. The vibration characteristics of the entire tall structure may be influenced by the selection of the elastic spring-damping characteristics of the clamping means and by the selection of the arrangement of the clamping on the mast that is by the spacing between the pivot bearing and the elastic clamping. Thus, by a corresponding selection of the mentioned parameters it is possible, for example, to influence the resonance frequencies of the structure in such a manner that the frequencies are lower than any vibrations occurring otherwise in the system. For example, the resonance frequencies may be kept below the frequency of the rotor of the power-driven wind generator. This lowering of the resonance frequency cannot be accomplished by economically justifiable means in other structures. For example, it is not possible to lower, by economical means, the resonance frequency of rigidly supported structures. However, even in connection with prior art stay wire reinforced structures, it is possible to achieve the so-called supercritical system characteristic by means which are economically justifiable. On the other hand, according to the invention, a structure not using any stay wire reinforcement can be supported so that its resonance frequencies are lowered by simple means thereby utilizing the flexibility of the structure.

The construction of the pivot bearing may be conventional. However, it must be assured that the weight of the structure is so supported that the permissible pivoting movement remains within defined tolerance limits of the pivot resistance throughout the operational life of the structure.

The elastic clamping may, for example, be realized by elastomeric clamping means or by hydraulic, pneumatic and mechanical devices or combinations thereof. In addition to the mentioned requirements regarding the support, elasticity and damping characteristics, it is necessary to assure that the bearings and the structure are secured against unpermissible radial and axial movements.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
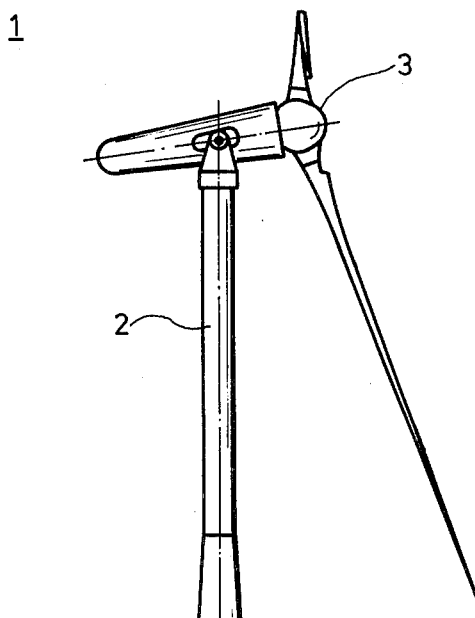
FIG. 1 is a side elevational view of a tall structure supported according to the invention by support means shown in section including a pivot bearing at the foot of the mast and an elastic clamping.

FIG. 1 shows a wind-driven power generator 1 comprising a mast 2 and a rotor 3 conventionally secured to the top of the mast. The mast 2 is held in the ground in a foundation 5. The foundation 5 has a circular cross-section and is made of reinforced concrete. In this example embodiment the mast 2 comprises at its lower end or foot a bearing ball 6 which rests in a bearing pan 7 of a bearing plate 8 embedded in the bottom of the foundation 5. The bearing ball 6 and the bearing pan 7 or rather the bearing plate 8 form together a pivot bearing 10 for the mast 2. An arresting plate 9 may be secured on top of the bearing plate 8 in order to prevent that the bearing ball 6 is lifted out of the bearing plate 8.

An elastic ring bearing 11 is operatively interposed at the upper edge of the foundation 5 in the gap between the inwardly facing wall of the foundation and the outer wall of the mast. The elastic ring bearing 11 is secured to the foundation 5. Such an elastic ring bearing comprises, for example, as shown in FIG. 1, a plurality of stacked spring damper elements 12. Under simple circumstances, such spring damper elements 12 may comprise stacked rubber rings secured to the foundation. However, this type of clamping device is suitable only for relatively light structures. Where heavy structures are involved, the elastic ring bearing will cause large quantities of heat and a resulting heat accumulation due to the high inner friction. In such instances, different structures are preferable as, for example, shown in FIG. 2.

Figure 2:
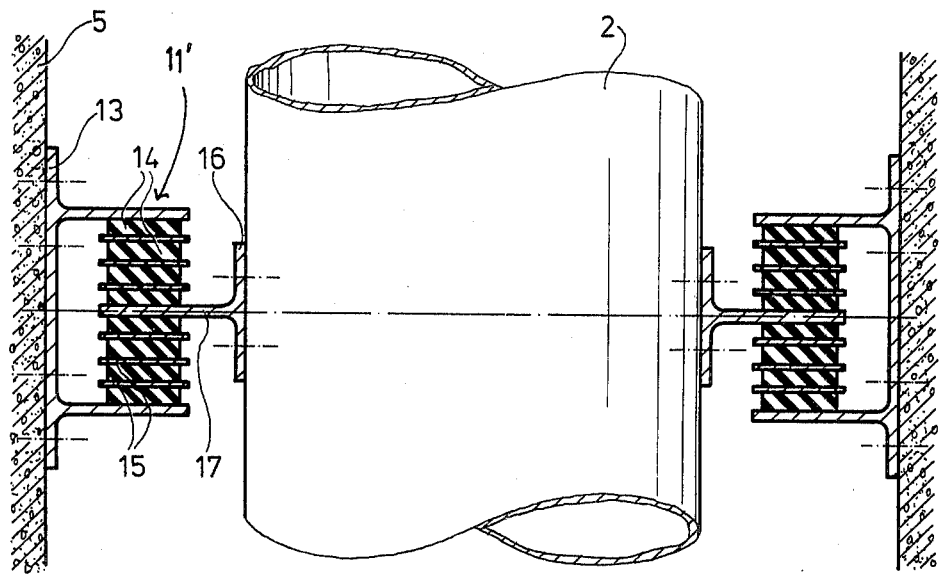
FIG. 2 is a longitudinal, sectional view through an elastic clamping of the mast according to a second embodiment of the invention.

FIG. 2 shows a longitudinal section through an elastomeric ring bearing 11'. A ring-shaped bearing holder 13 having a U-cross-section or profile is secured to the wall of the foundation 5 whereby elastomeric rings 14 and support or cooling lamellae 15 are alternately stacked between the upper and lower rib of the U-profile. For example, eight elastomeric rings 14 and six cooling or support lamellae 15 are provided in the shown embodiment of FIG. 2. The mast on its part is surrounded by a sleeve 16 in the zone of the elastomeric rings. A support ring 17 extends radially from the sleeve 16. The ring 17 reaches between the fourth and fifth elastomeric ring 14 and is secured between these rings. This type of elastomeric shearing bearing is capable to take up well the occurring pivoting and shearing forces. In this type of structure according to the invention heat accumulation is prevented because the cooling lamellae 15 conduct any heat generated by internal friction into the foundation. If necessary, the cooling lamellae could be constructed as hollow ribs through which a cooling liquid may flow or which are connected in a heat conducting manner to a heat dissipating body not shown.

In place of the just described elastomeric clamping devices or laterally yielding bearings it is possible to use other structures for the elastic clamping of the mast. For example, mechanical or hydraulic or pneumatic structural components may be used singly or in combination with the elastomeric elements.

Whatever structure is used for the elastic ring bearing 11', the latter is so constructed that the mast may move within limits in all radial directions. These limits are determined by the elastic characteristics counteracting said movements whereby any vibrations occurring with the movement of the mast are damped.

Figure 3:
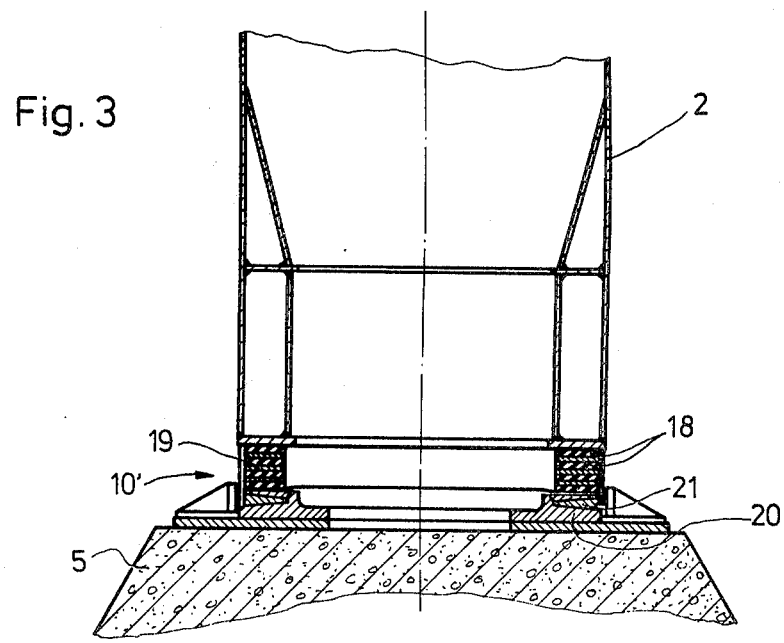
FIG. 3 is a longitudinal, sectional view through a pivot bearing according to a further embodiment of the invention.

FIG. 3 illustrates an elastomeric pivot bearing 10' comprising a plurality of elastomeric support rings 18 and metal rings 19 alternately stacked one above the other whereby the stack rests on a metal ring 20. As in the elastic clamping 11', the metal rings in FIG. 3 also serve for the purpose of support and/or as cooling rings. The mast 2 rests with its foot on the bearing package comprising the elastomeric support rings 18 and the metal ring 19. Adjusting and mounting wedges 21 are used for adjusting the mast position. These wedges 21 are arranged between the bearing packet and the bearing seat formed by the ring 20. This type of support also provides a means for positively influencing the resonance frequencies of the structure in addition to the control provided by the clamping device shown in FIG. 2.

In the embodiment of FIG. 1 the top edge of the foundation 5 is substantially flush with the surface of the ground 4. The mast 2 is elastically held at the top edge of the foundation. For this purpose the mast is provided with a largest diameter portion shown at 12'. It will be appreciated that this type of lateral holding or supporting is intended to represent but one example embodiment. It is quite possible to provide the lateral holding or supporting at a point above the ground surface. In such an embodiment bracing ribs would extend from the largest diameter mast portion above the ground into the foundation or such braces would be anchored in the ground. In any event, the location of the largest diameter portion, that is, the spacing between the pivot bearing and the lateral elastomeric ring bearing and the bearing characteristic are so adjusted or determined that the resonance frequencies of the mast are lowered as much as possible and the respective amplitudes are damped as much as possible. The structure to be supported must operate under supercritical operating conditions; the holding and supporting of the mast is selected so that the frequency of the resonance vibrations of the mast are lower than the frequency of the main excitation forces causing said mast vibrations.

Although the invention has been described with reference to specific example embodiments, it will be appreciated, that it is intended to cover all modifications and equivalents within the scope of the appended claims.

What is claimed is:

1. An apparatus for anchoring a foot of a tall structure in the ground, said tall structure being subject to dynamic forces loading the tall structure with horizontally effective load components and with vertically downwardly effective load components, comprising a substantially rigid foundation, said foundation having side wall means and bottom wall means forming an opening for receiving said foot, said foundation side wall means forming a ring gap around said foot, said foundation bottom wall means being spaced from said foot to form a further gap, said apparatus further comprising elastic ring bearing means (11, 11') operatively interposed in said ring gap between sides of said foot and said foundation side wall means substantially near an upper edge of said foundation side wall means, said elastic ring bearing means comprising at least one elastic ring bearing element having a spring damper characteristic for holding said foot substantially against said horizontal load components and for damping vibrations of the tall structure, and pivot bearing means (10, 10') operatively interposed in said further gap between the bottom wall means of the foundation and said foot for taking up substantially only said vertically downwardly effective load components, said pivot bearing means being located at a given vertical spacing from said ring bearing means.

2. The apparatus of claim 1, wherein the spring damper characteristic of said one elastic ring bearing element, and said vertical spacing between said pivot bearing means (10) and the elastic ring bearing means (11) are adjusted and tuned relative to each other for lowering resonance frequencies of the tall structure (2).

3. The apparatus of claim 1, wherein said elastic ring bearing means comprise an elastomeric thrust or shear bearing including elastomeric rings (14) forming a stack and at least one support ring (17) reaching into said stack, said elastomeric bearing being operatively connected to the foundation side wall means and to the side of the tall structure, said supporting ring being secured between the elastomeric rings.

4. The apparatus of claim 1, wherein said elastic ring bearing means comprise cooling means (15) for dissipating heat loads occurring when the tall structure (2) moves.

5. The apparatus of claim 1, wherein said pivot bearing means at the foot of the tall structure (2) comprises an elastomeric bearing (10') comprising a plurality of stacked elastomeric supporting rings (18, 19).

6. The apparatus of claim 5, wherein said elastomeric pivot bearing means (10') further comprises cooling means (19) for dissipating heat loads occurring when the tall structure (2) moves.

* * * * *